UNITED STATES PATENT OFFICE.

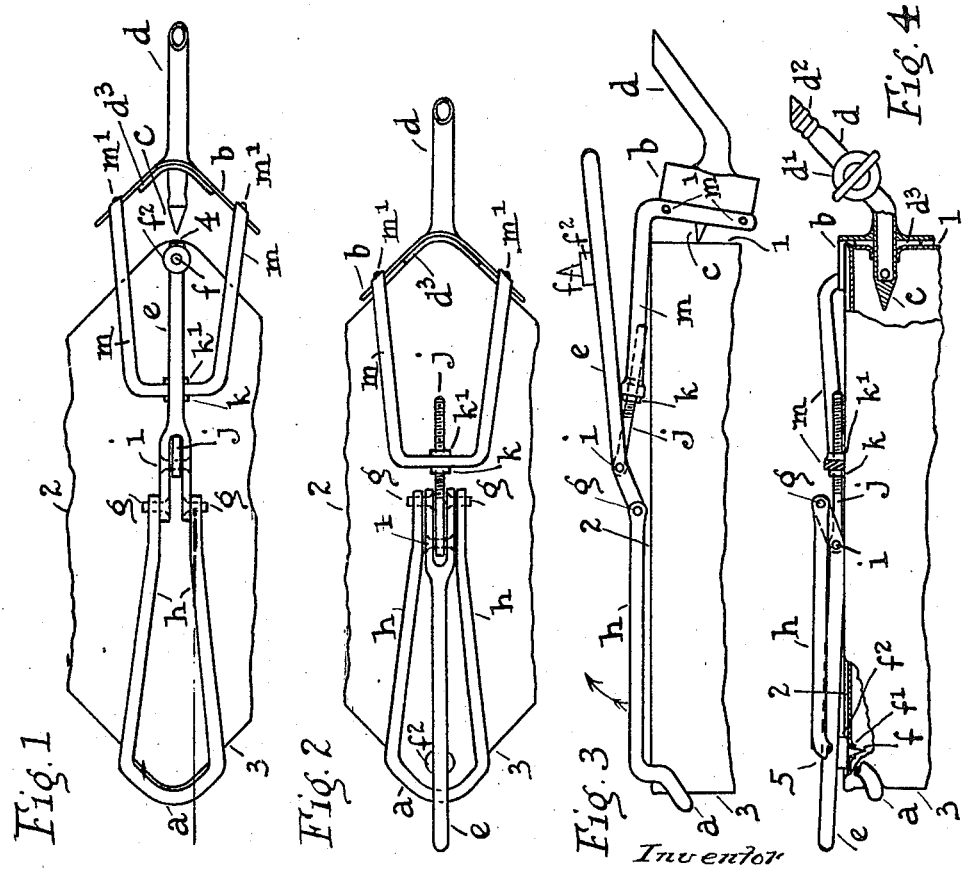

JAMES WALKER, OF CARNARVON, WESTERN AUSTRALIA, AUSTRALIA.

ATTACHMENT FOR DISCHARGE OF LIQUID FROM CONTAINERS.

1,311,103.    Specification of Letters Patent.    Patented July 22, 1919.

Application filed December 18, 1918. Serial No. 267,313.

*To all whom it may concern:*

Be it known that I, JAMES WALKER, a subject of the King of Great Britain and Ireland, etc., residing at Carnarvon, in the State of Western Australia, Commonwealth of Australia, have invented certain new and useful Improvements in Attachments for Discharge of Liquid from Containers; and I do hereby declare the following to be a full, clear, and exact description of the invention, such as will enable others skilled in the art to which it appertains to make and use the same.

My invention relates to an appliance for attachment to metal vessels such as petrol or kerosene tins or other containers of liquid, to facilitate discharge of all or part of the contents. The vapor of petrol or the like is often dangerous making some attachments unsuitable for petrol which are usable in other cases.

An appliance for attachment for petrol tins should, to suit my ideas, be simple, cheap, light, small, and have means of adjustment. It should fold into a small space and be applicable also to kerosene, varnish and other tins in an easy and rapid manner without spilling liquid. My appliance possesses the said advantages.

By one swinging stroke of a handle I cause the following to take place when required:—

(1) The container becomes tightly clamped by the appliance.

(2) It becomes perforated and its contents put in comunication with an outlet tube or tap, and a washer prevents leakage.

(3) The handle locks itself or becomes secure in its new position; and, when wanted—

(4) An air hole is made, and (with or without the assistance of a washer) is closed, but a slight adjustment allows air to be admitted.

The appliance is made for clamping upon, or up the side of, an angular or other container, and has details varied to suit various forms and sizes of containers.

In the accompanying drawings simple forms of my article are illustrated, the construction not being limited to the designs, proportions, or precise details shown.

Figure 1 is a plan of part of a container top on which my appliance is set loosely, preparatory to diagonally clamping upper corners of the container.

Fig. 2 is a plan of the parts in Fig. 1, but with my appliance clamped.

Fig. 3 shows a side view of Fig. 1.

Fig. 4 is a side view of Fig. 2.

Figs. 5 and 6 show a side and a front view, respectively, of my appliance modified, and clamped in a vertical position.

1 and 3 show opposite sides of the vessel, 2 its top, and $2^a$ its base. In Fig. 4 the vessel is broken away to show its interior; at 4 part of the handle is broken away, and at 5 part of a clamp member is broken away.

My appliance has jaws $a$, $b$,—or $a^1$, $b^1$,—suitably shaped to grip predetermined opposite parts of the vessel, and has a perforator, $c$ or $c^1$, of any suitable form at the inner end of a suitable discharge tube $d$ which may have a strainer (not shown) and is made with or without a cock $d^1$, and can be used with or without a flexible hose, means for attaching which is shown as screw thread $d^2$.

A leak preventer, as washer $d^3$, is located around tube $d$ against jaw $b$, or $b^1$.

A lever handle $e$ is provided, and in some cases carries any suitable piercer $f$ to make an air hole in the vessel when the lever handle is finishing its clamping stroke.

The piercer is shown fixed but in some cases is adjustable, as by being pivoted to the lever or is removable so that no hole will be pierced by the clamping stroke.

The piercer preferred is a pin which is tapered at its lower end which when depressed closes air tight the hole $f^1$ it makes, but the lifting of the handle will remove the pin (or part of it) from the hole, and owing to the said taper even a little lifting will allow a hole, open to the air, to exist.

$f^2$ is a washer securely set on the piercer to better close the air hole, when required.

Lever $e$ is pivoted as at $g$ to a jaw-holding member $h$, and carries pivoted as at $i$, a connecting member or bolt $j$, which is in some cases screw threaded and carries adjusting means as nuts $k$, $k^1$. This connecting member is attached to a jaw holding member $m$, which carries jaw $b$ or $b^1$, $m^1$ showing rivets.

By adjusting member $m$ relatively to adjustment member $j$ the distance between jaws $a$, $b$, or $a^1$, $b^1$, is regulated to obtain a tight grip of the container by the said jaws. It will be noticed that member $h$ can by moving it in the direction of the arrow in Fig. 3 be folded over the rest of the appliance for greater portability. Just before the clamping stroke is completed the lever has a toggle action and thus when the stroke is completed the lever resists retraction. This will be clear by an inspection of the positions assumed by the pivots shown.

Having described this invention what is claimed by Letters Patent is:—

1. In a can punching and pouring attachment, the combination of a frame having an end portion which is V-shape in cross section to engage the corner of a can and extended portions which are bent and connected at their ends, a hollow punch supported in the portion which is V-shape in cross section to form an opening in a can and also serve as a spout, a second frame formed with an angularly bent portion at one end to engage the opposite side of a can, a lever pivoted between the legs of the second mentioned frame and a pivot connection between the lever and the connection at the ends of the extension on the first mentioned frame, whereby when the lever is moved in one direction, the hollow punch will be driven into the can and the angular bent portion of the second mentioned frame will grip the opposite side of the can.

2. In a can punching machine, the combination of a frame provided with a hollow punch to engage a can, the frame having an opening, a screw extending through the opening, and formed at one end with an eye, a second frame formed with a bent portion to engage the opposite side of a can, the inner ends of the second frame having alined openings, a lever having a bi-furcated end formed with alined openings, a pivot extending through the alined openings in the lever and the openings in the second mentioned frame, a pivot pin extending through the eye in the screw and the lever and a punch on the lever, whereby when the lever is thrown in one direction the hollow punch will be driven into the can and the second mentioned frame will grip the opposite side of the can, and the punch on the lever will form a vent opening in said can.

In witness whereof I have hereunto set my hand.

JAMES WALKER.

Copies of this patent may be obtained for five cents each, by addressing the "Commissioner of Patents, Washington, D. C."